US006755637B1

(12) United States Patent
Rossi

(10) Patent No.: US 6,755,637 B1
(45) Date of Patent: Jun. 29, 2004

(54) INJECTION MOLDING APPARATUS HAVING A NOZZLE CARRYING PLATE

(75) Inventor: Massimo Rossi, Orsago (IT)

(73) Assignee: Sipa S.p.A., Vittorio Veneto (IT)

(*) Notice: Subject to any disclaimer, the term of this patent is extended or adjusted under 35 U.S.C. 154(b) by 8 days.

(21) Appl. No.: 10/169,258

(22) PCT Filed: Nov. 8, 2000

(86) PCT No.: PCT/EP00/11008

§ 371 (c)(1),
(2), (4) Date: Jun. 28, 2002

(87) PCT Pub. No.: WO01/47684

PCT Pub. Date: Jul. 5, 2001

(30) Foreign Application Priority Data

Dec. 28, 1999 (IT) .................................. PN990055 U

(51) Int. Cl.[7] .............................................. B29C 45/22
(52) U.S. Cl. ...................... 425/190; 425/549; 425/570
(58) Field of Search ................................ 425/549, 570, 425/572, 190

(56) References Cited

U.S. PATENT DOCUMENTS

| 3,822,856 | A | * | 7/1974 | Gellert | ........................ | 425/549 |
| 5,061,174 | A |   | 10/1991 | Gellert |  |  |
| 5,366,369 | A | * | 11/1994 | Gellert | ........................ | 425/549 |
| 6,162,043 | A | * | 12/2000 | Gellert | ........................ | 425/549 |
| 6,530,775 | B2 | * | 3/2003 | Yu | ............................. | 425/549 |

FOREIGN PATENT DOCUMENTS

| DE | 3407894 A | 9/1985 |
| EP | 0444455 A | 9/1991 |
| EP | 07047564 | 2/1995 |
| EP | 0937565 A | 8/1999 |

OTHER PUBLICATIONS

Patent Abstracts of Japan, vol. 1995, No. 05, Jun. 30, 1995 & JP 01 047564 A (Mitsubishi Materials Corp), Feb. 21, 1995, abstract & Database WPI, Week 199517, Derwent Publications Ltd., London, GB; AN 1995–125842, XP002159195, abstract.
Patent Abstracts of Japan, vol. 010, No. 115 (M–474), Apr. 30, 1986 & JP 60 244514 A (Nippon Seikosho KK), Dec. 4, 1985, abstract.
W. Wadsack, "Das kalte", Heisskanalsystem, Plast Verarbeiter, vol. 30, No. 11, 1979, p. 706, XP002159194, figure.
"Direct channel heating for hot–runners", Modern Plastics, International, CH, McGraw–Hill, Inc., Lausanne, vol. 15, No. 9, Sep. 9, 1985, p. 8, XP002115780, ISSN: 0026–8283, figure.

* cited by examiner

Primary Examiner—Tim Heitbrink
(74) Attorney, Agent, or Firm—Wenderoth, Lind & Ponack, L.L.P.

(57) ABSTRACT

An injection-molding half-mold has a base plate (1), a nozzle-carrying plate (2), a cavity-carrying plate (3), and a hot runner (4) to which there are associated a plurality of resistive elements (6) connected externally to a power supply source via at least an electric conductor (9, 19) lead connected to an appropriate external connector. The nozzle-carrying plate (2) can be removed from the hot runner (4) without any need for either the electric conductor lead (9, 19) or the connections of the latter to the resistive elements (6) to be disconnected

7 Claims, 7 Drawing Sheets

INJECTION MOLDING APPARATUS HAVING A NOZZLE CARRYING PLATE

BACKGROUND OF THE INVENTION

The present invention refers to the main component parts of an injection mold adapted to enable a plastic substance in its fluid, i.e. molten state, usually just after the extrusion thereof, to be injected into appropriate cavities for forming related preforms. In particular, the present invention applies, in a preferred manner, to machines adapted for molding a plurality of plastic articles at the same time, ie. the so-called "preforms" that are intended for subsequent processing by blow molding into appropriate final containers, especially plastic bottles.

Although reference will be made in the following description, mainly for reasons of greater descriptive convenience, to a machine for moulding preforms of plastic material, as this is used in combination with the preliminary steps of melting and extrusion of said plastic material, it will be appreciated that the present invention shall be understood as applying also to other kinds of uses or applications, as far as these fall within the scope of the appended claims.

It is generally known in the art that, during the preform molding operation, use is generally made of a molding machine comprising a stationary half-mold, which is firmly joined to the structure of the same machine, and a moving half-mold, which preferably moves in a vertical direction and is selectively closable into an appropriate position against the stationary half-mold.

In prior-art solutions, the stationary half-mold usually comprises a base plate 1, a nozzle-carrying plate 2, a cavity-carrying plate 3, at least a hot runner 4, a plurality of nozzles 5, a plurality of resistive elements 6 associated with the hot runner, and a plurality of resistive elements 7 associated with the nozzles 5.

The nozzle-carrying plate 2 is in the shape of a U turned upside down, and is arranged in an intermediate position between the base plate and the cavity-carrying plate. This is illustrated in FIGS. 1 and 2, which are views of the three different plates in assembled and separated positions thereof, respectively.

The resistive elements 6 are connected to a power supply source (not shown) via a respective plurality of electric conductor leads 9. Each one of them is furthermore inserted in a wall of the nozzle-carrying plate and passes therethrough, coming out on the outside thereof, where it is connected to a respective terminal clamp of an appropriate connector 14.

The resistive elements 7 that are associated with the nozzles 5 in the nozzle-carrying plate 2 are in turn connected to a power supply source (not shown) via a respective plurality of electric conductor leads 11, connecting the respective resistive element 7 to a respective terminal clamp comprised in the same connector 14 that already connects the above-described electric conductor leads 9.

It is therefore obvious that each one of the electric conductor lead 11 is contained, as shown in the Figures, in the body of the nozzle-carrying plate 2.

All this is anyway largely known to ail those skilled in the art and is only reviewed here shortly in order to more effectively introduce the technical context which the present invention actually refers to.

During the practical use of the mold, there are quite frequently occurring such operating conditions as to make it necessary for access to be gained most conveniently and easily, as well as with a maximum extent of freedom in intervening, to the hot runner or the nozzles. In the majority of the cases, these operating conditions are brought about by the maintenance needs of the hot runner, e.g. due to a failed heating element requiring replacement, or due to a nozzle having plugged up, or, more simply, due to the hot runner itself needing to be cleaned up and cleared of slag and scum depositing therein after a prolonged use.

In all those circumstances in which the nozzle-carrying plate 2 must be disassembled and separated from the hot runner, the need logically arises for all conductor leads 9 to be first disconnected from respective terminal clamps (not shown) in order to be able to disengage the nozzle-carrying plate 2 from the hot runner and then remove the plate 2. However, the disconnection of all the terminal clamps involved in such an operation is considerably time consuming, i.e. requires a lot of time during which the whole plant must of course be kept at a standstill, ie. inoperative.

Upon conclusion of the planned maintenance or similar intervention, the reverse operation must be then carried out to re-connect all the conductor leads to respective terminal clamps. This obviously requires a further lot of time and, therefore, this puts a further downtime penalty on the whole plant.

In other words, such operations of disconnecting and reconnecting the above cited conductor leads, which are inherently rather long and delicate to carry out, demand a considerable extension of the machine downtime and an equally considerable increase in the number of man-hours spent with respect to the time and man-hour requirements of the actual maintenance intervention. Such an extension is hardly compatible with the productivity requirements placed on such machines, which are designed and made for heavy-duty operation, i.e. so as to be able to operate in a substantially continuous manner.

Based on the above considerations, it is therefore a main purpose of the present invention to provide a type of stationary half-mold which is adapted to do away with the above described drawbacks, is capable of being easily implemented using readily available and, therefore, cost-effective materials and techniques, and is further easy, reliable and safe to use.

Such an aim of the present invention, along with further features thereof, is reached in a type of mold that is made and operates as recited in the appended claims.

BRIEF DESCRIPTION OF THE DRAWINGS

The present invention may take the form of a preferred, although not sole, embodiment, such as the one that is described in detail and illustrated below by way of non-limiting example, with reference to the accompanying drawings, in which.

DETAILED DESCRIPTION OF THE PREFERRED EMBODIMENTS

Although reference will be made in the following description to a vertical-drive, vertically extending machine, in which the stationary half-mold has its cavities facing upwards, it will be appreciated that the present invention shall be understood as also applying to and being useful for any other kind of molding machines, in particular also the so-called horizontal-drive ones, in which the moving half-mold moves with a horizontal motion.

Figure 1:
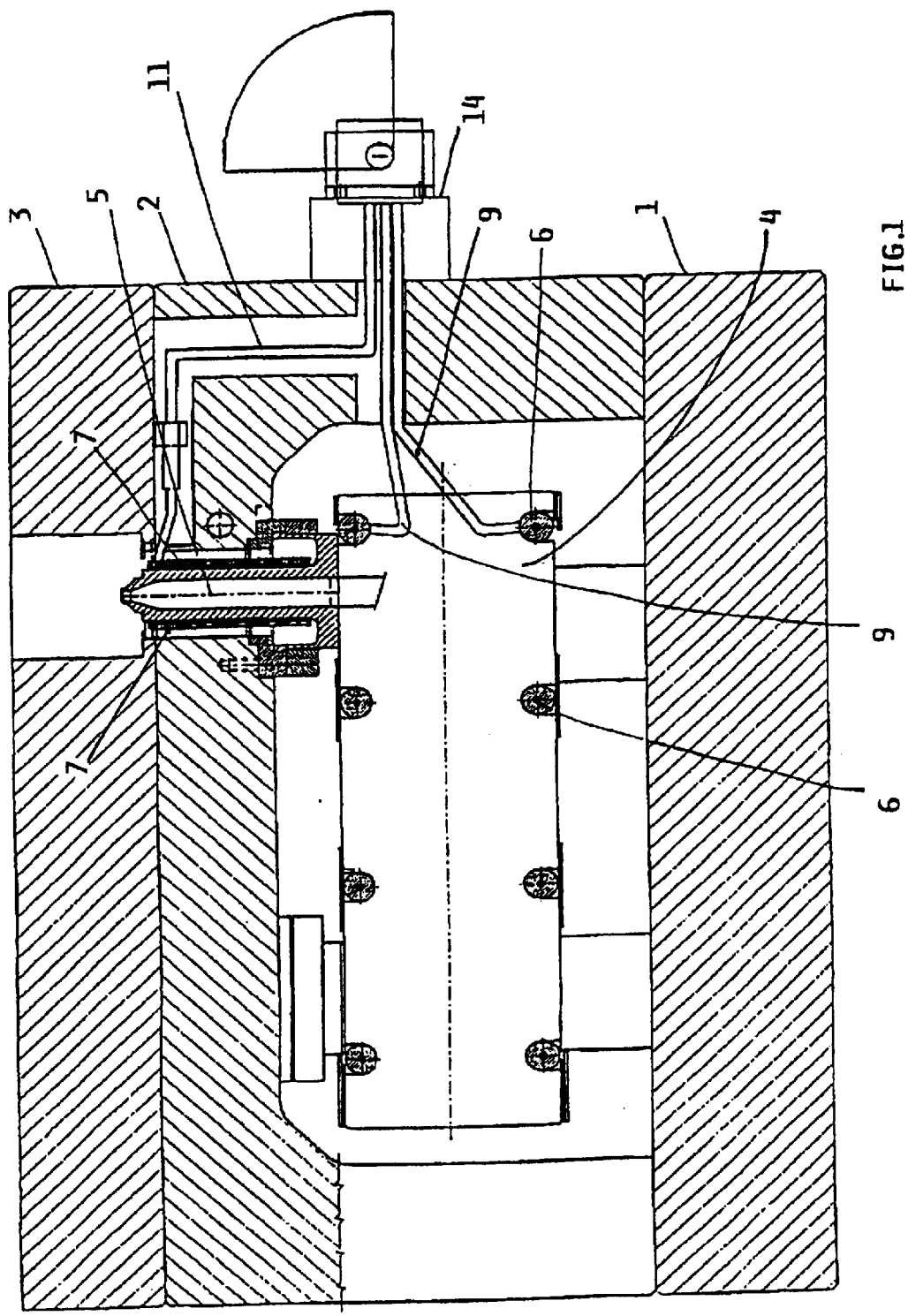
FIGS. 1 and 2 represent the Prior Art described above.
Figure 2:
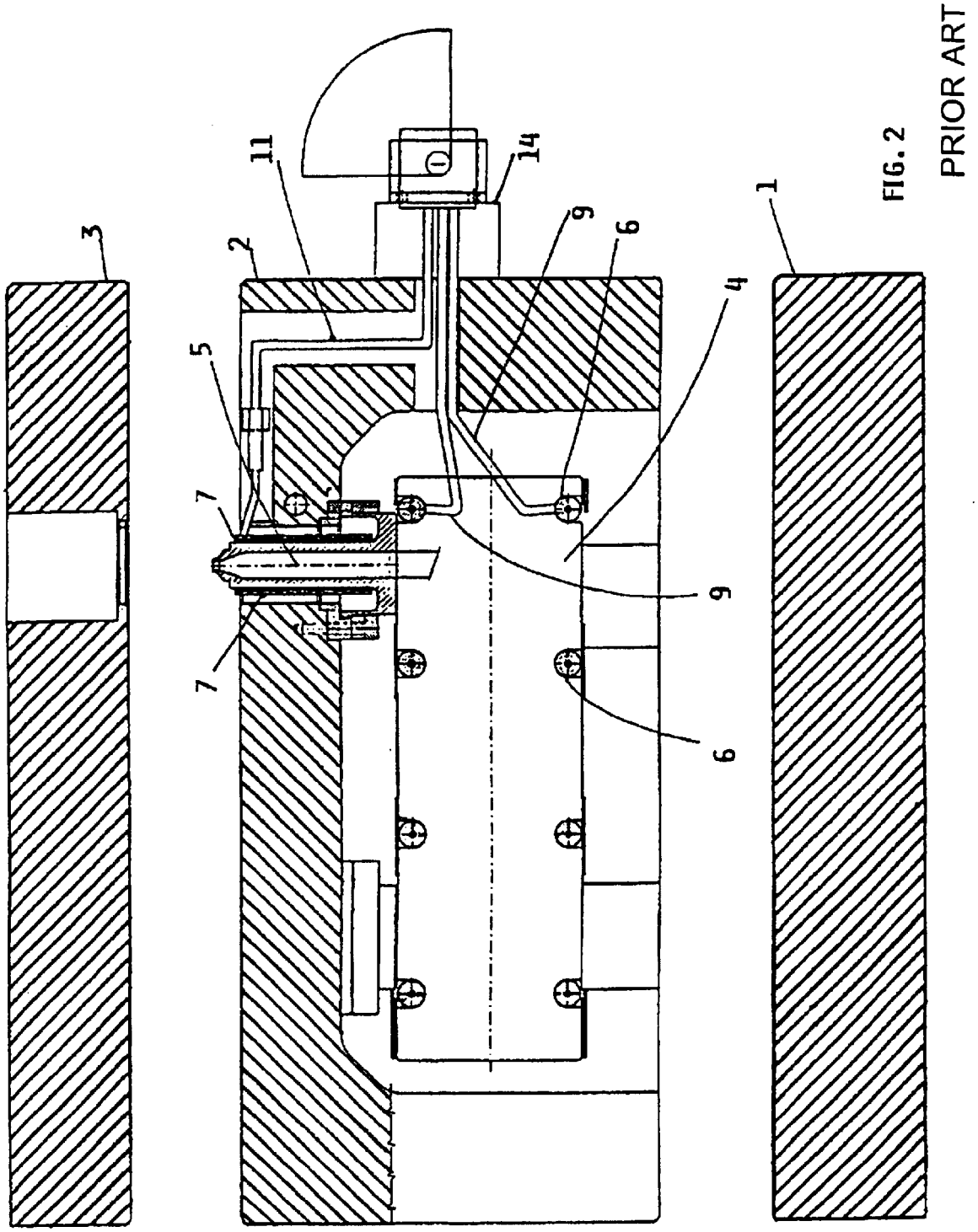

With reference to the above listed FIGS. 3 to 7, the component parts that are similar or correspond to the component parts illustrated in FIGS. 1 and 2 are indicated with the same reference numerals, for reasons of greater comprehension and comparative convenience.

A half-mold adapted to be used to produce preforms of plastic material comprises, as usual, the afore mentioned three plates along with corresponding resistive elements 6 and 7, as well as the nozzles 5.

The base plate 1 is provided with a housing 15 that is open upwards and, therefore, given the type of example described here, towards the nozzle-carrying plate 2. The housing 15 is delimited outwardly by at least a kind of shoulder 16.

The base plate 1 is further provided, along an upper edge 20 of the shoulder 16 thereof, and therefore opening towards the respective nozzle-carrying plate, with a recess 21 passing through from the housing 15 inside the base plate, in which there is arranged the hot runner 4, to the outside of the base plate.

The half-mould further comprises, according to the present invention, a plurality of electric conductor leads 19, each one of which connects a respective resistive element 6 of the hot runner to a respective external terminal clamp connected to a power supply source (not shown).

These electric conductor leads 19 are partly housed in the recess 21 that enables them to be able to be removed from the base plate, without any need for them to be disconnected from the hot runner, by simply lifting them out of the through-passing recess.

The nozzle-carrying plate 2 is in turn provided with a plurality of electric conductor leads 22 connecting respective resistive elements 7 to an external power supply source (not shown).

Figure 4:
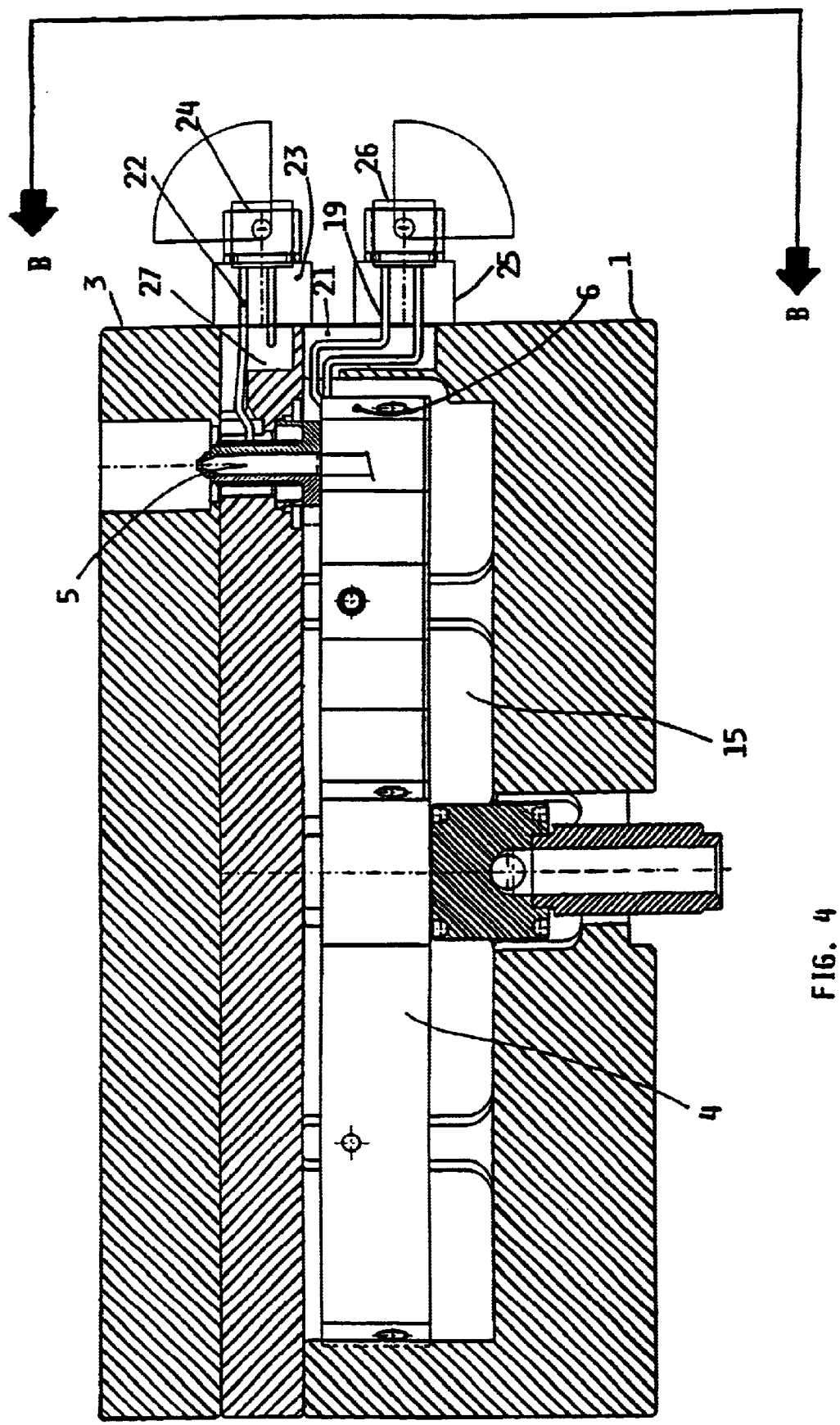
FIG. 4 is the same view as the one appearing in FIG. 3, but with the plates connected to each other in their operating state.
Figure 5:
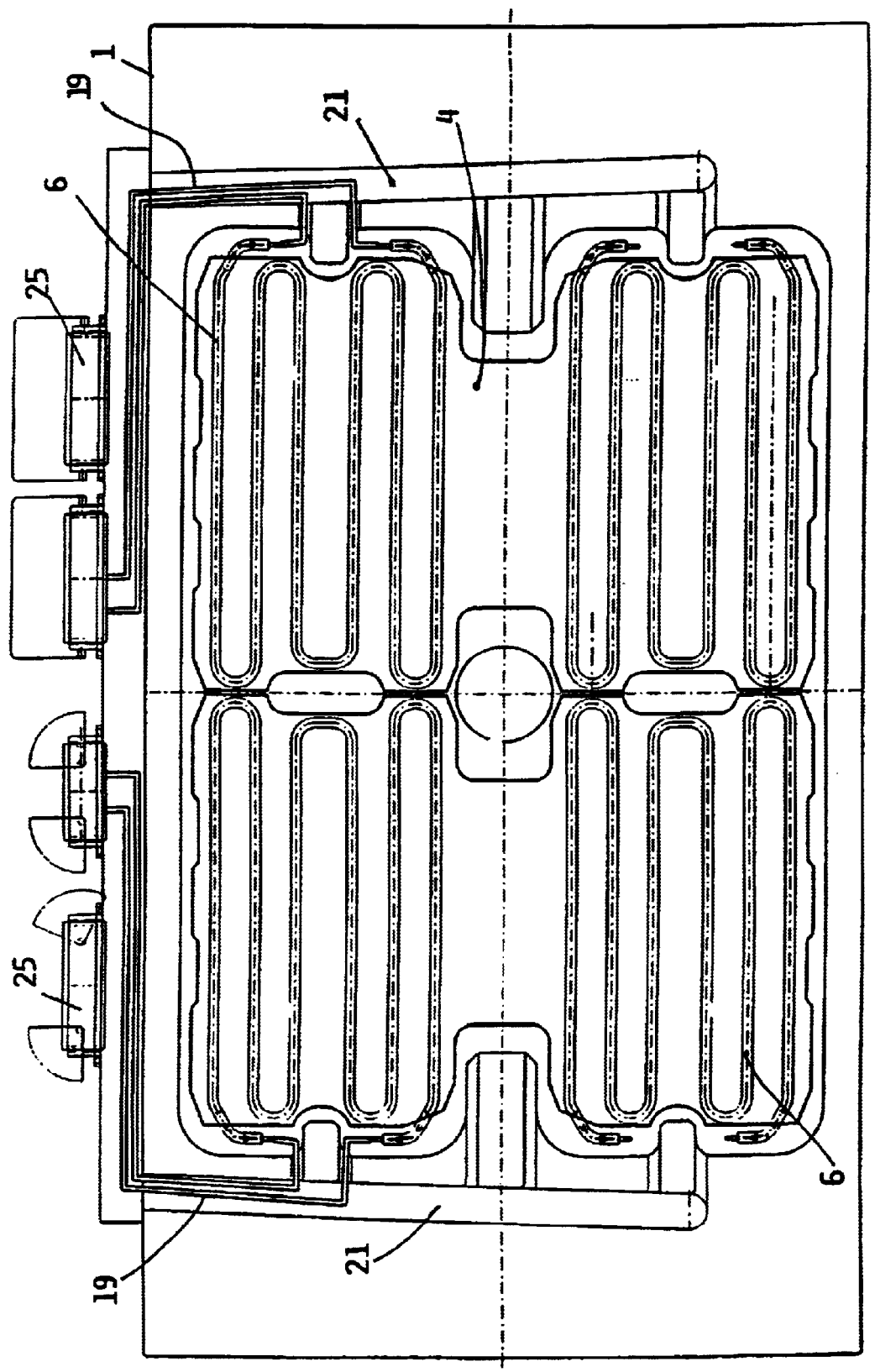
FIG. 5 is a view of the base plate as seen from section A—A of FIG. 3.
Figure 6:
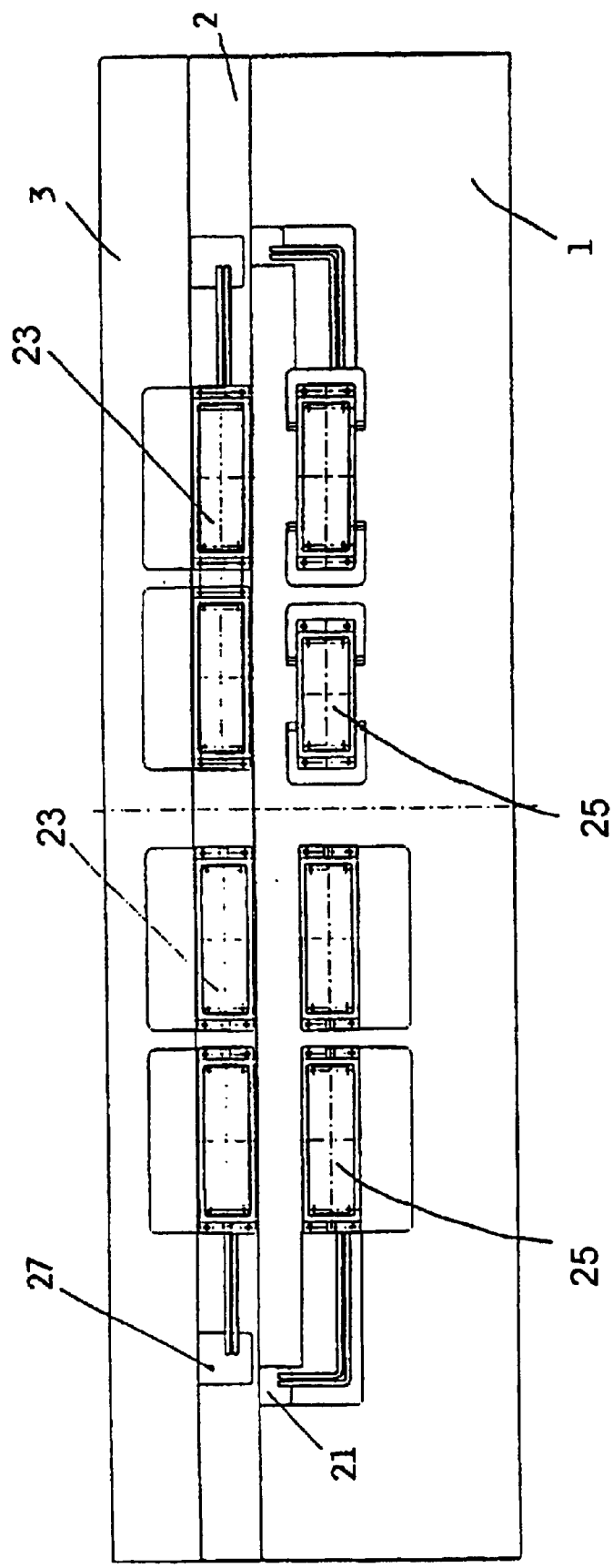
FIG. 6 is a view of the base plate as seen from section B—B of FIG. 4.

In an advantageous manner, in order to enable the nozzle-carrying plate 2 to be displaceable with respect to the base plate 1, i.e. removable therefrom, the electric conductor leads 22 are connected externally to an appropriate connector 23 arranged on an outer side of the same nozzle-carrying plate 2, as illustrated in FIGS. 4 and 5, in such a manner as to ensure that the connector is able to be readily coupled with a further connector 24 which the power-supply leads for the energization of the resistive elements 7 are connected to.

Figure 7:
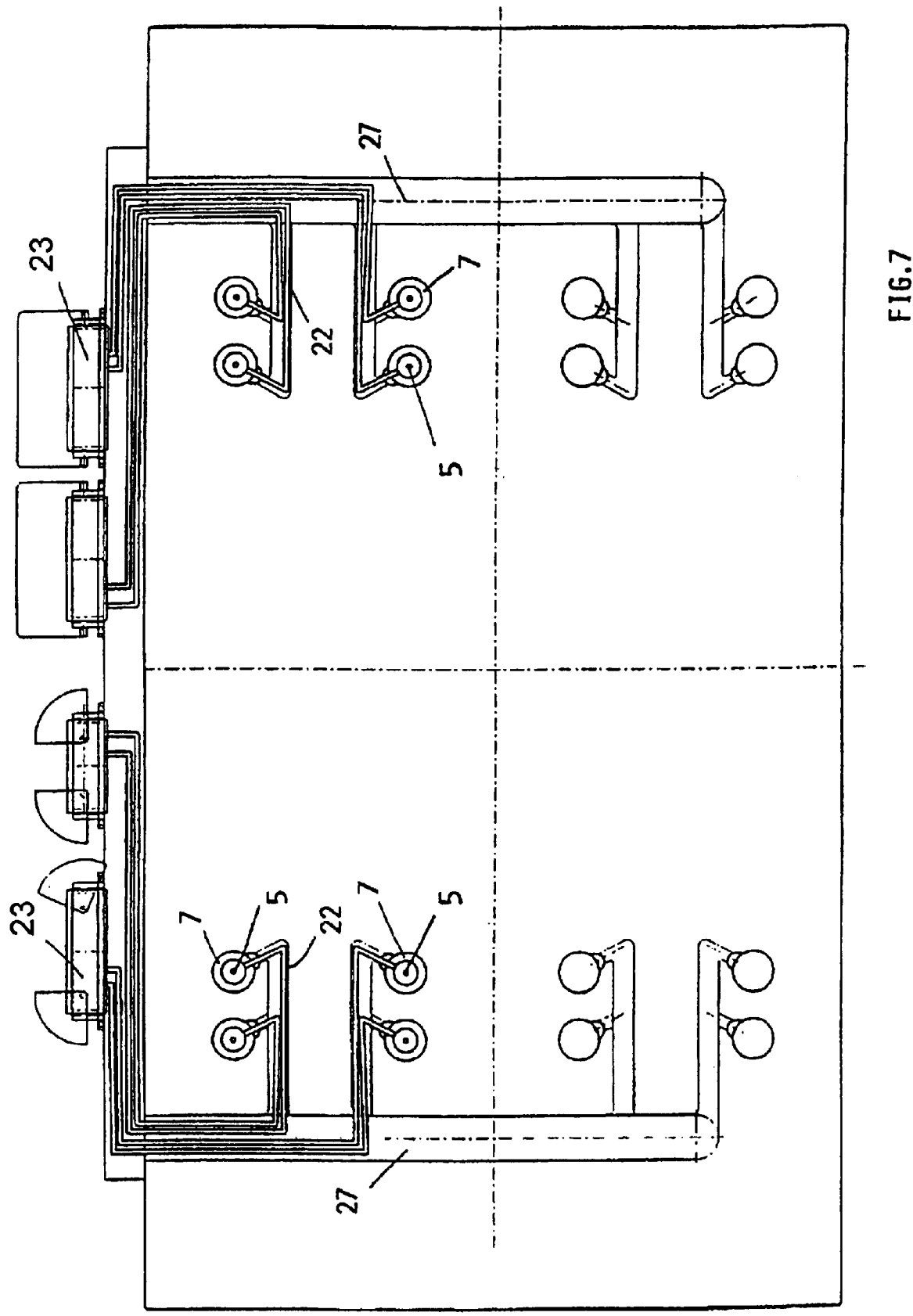
FIG. 7 is a view of the nozzle-carrying plate as seen from section C—C of FIG. 3.

Furthermore, it proves equally advantageous if the electric conductor leads 19 are connected externally to an appropriate respective connector 25 arranged on an outer side of the same base plate 1, as illustrated in FIGS. 4, 5 and 7, in such a manner as to ensure that the connector 25 is able to be readily coupled with a further connector 26 which the power-supply leads for the energization of the resistive elements 6 associated with the hot runner 4 are connected to.

Figure 3:
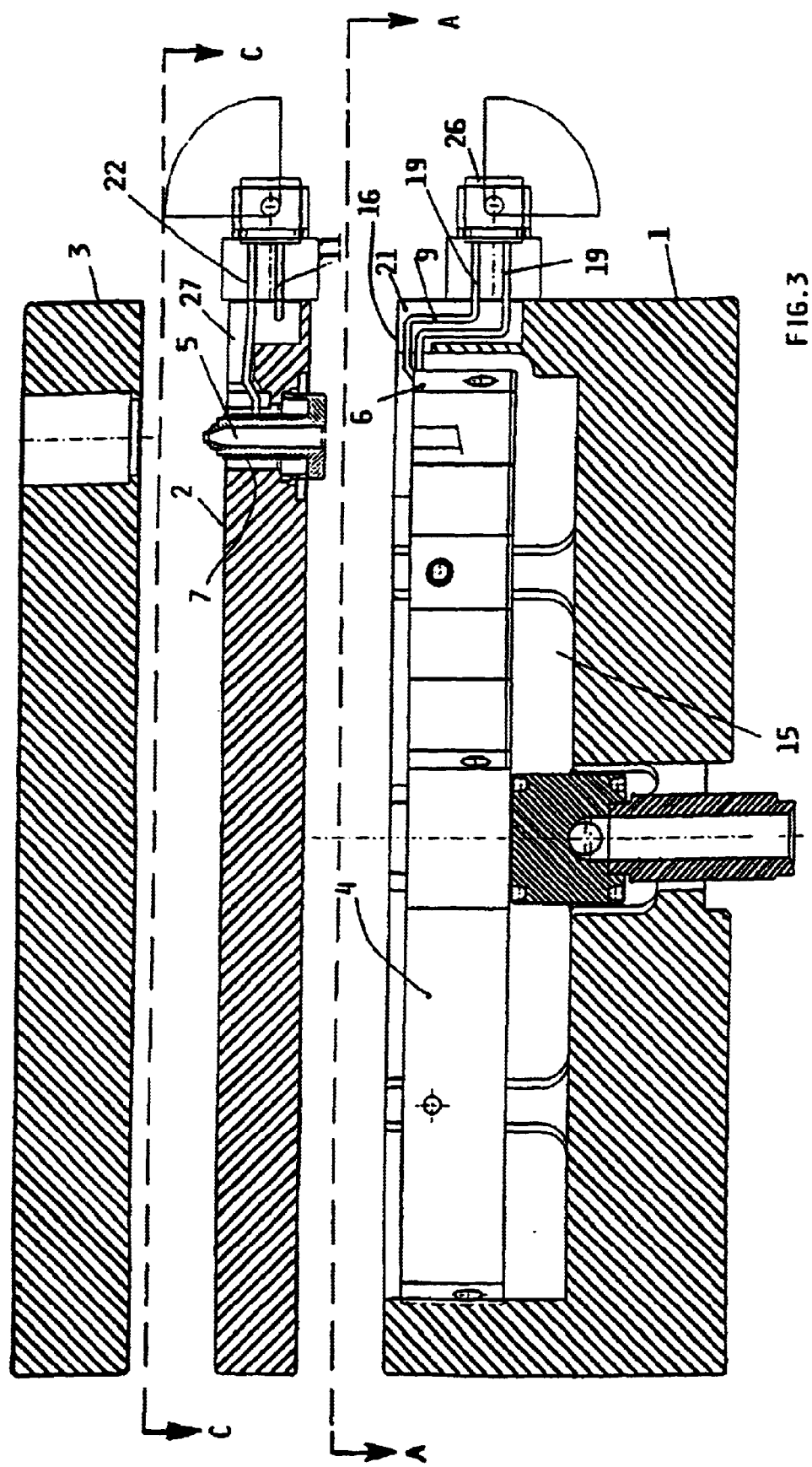
FIG. 3 is a vertical cross-sectional view of a half-mould according to the present invention, with a base plate, nozzle-carrying plate and cavity-carrying plate thereof in a mutually aligned arrangement, but separated from each other.

A suitable improvement lies in providing in the nozzle-carrying plate 2 a through-slot 27 having at least a side thereof opening outwardly, preferably upwards as shown in FIGS. 3, 4 and 7, in which the electric conductor leads 22 may be inserted throughout the distance covered by them from the resistive elements 7 and the connector 23.

The provision of such a through-slot enables in fact the connector 23, the related electric conductor leads 22 and the respective resistive elements 7 to be pulled out with a single operation, without any need arising for the said component parts to be disconnected from each other.

The operating modalities and the advantages of the present invention will at this point be apparent to all those skilled in the art. In fact, whenever a circumstance occurs or a need whatsoever arises, owing to which access has to be gained to the hot runner 4 or the nozzles 5, it will be sufficient for the three aforementioned plates to be mechanically separated from each other, as illustrated in FIG. 3, in order to readily gain free access to the hot runner or nozzles, without it being necessary for individually disconnecting the electric conductor leads 19 and 22 from and, when re-assembling, individually re-connecting the electric conductor leads 19 and 22 to, the respective terminal clamps of the respective resistive elements 6 and 7.

It will be also appreciated how, with this solution making use of distinct connectors 23 and 25 arranged on the outer surface of the base plate 1 and the nozzle-carrying plate 2, respectively, the possibility is also given for the nozzle-carrying plate to be most easily and quickly removed and replaced with a nozzle-carrying plate having different characteristics, as far as the latter is of course provided with the same kind of mechanical and electric interface elements.

In full accordance with the aims of the present invention, a half-mold has in this way therefore been implemented which enables the operating flexibility and productivity of the whole plant to be significantly boosted and the machine downtime to be considerably reduced, along with the working time required to both replace the nozzle-carrying plates and carry out any required maintenance work on the hot runner and the associated functional parts.

What is claimed is:

1. An injection half-mold, comprising:
   a base plate;
   a nozzle-carrying plate;
   a cavity-carrying plate;
   a hot runner;
   a plurality of resistive elements associated with said hot runner, said plurality of resistive elements being externally connected to a power supply source by a respective plurality of electric conductor leads that are connected to an external connector;
   a plurality of nozzles arranged and supported in said nozzle-carrying plate; and
   a plurality of resistive elements heating respective said nozzles, said plurality of resistive elements being contained in said nozzle-carrying plate and being connected to a power supply source by a respective plurality of electric conductor leads;
   wherein at least a portion of said plurality of electric conductor leads of said resistive elements of said nozzle-carrying plate is contained in the body of said nozzle-carrying plate, from which said plurality of electric conductor leads of said resistive elements of said nozzle-carrying plate extend to outside of said nozzle-carrying plate to be connected to a terminal clamp of a power supply connector; and
   wherein said nozzle-carrying plate is adapted to be removed and displaced away from said hot runner without disconnecting said plurality of electric conductor leads of said resistive elements of said nozzle-carrying plate or connections between said plurality of electric conductor leads and said resistive elements of said nozzle-carrying plate.

2. The half-mold of claim 1, wherein:

said hot-runner is contained in a housing provided in said base plate, said housing being capable of being closed by said nozzle-carrying plate; and said housing is delimited by at least a shoulder, said shoulder having a recess provided in correspondence with a side of said base plate facing said nozzle-carrying plate, and said recess being adapted to house said plurality of electric conductor leads of said resistive elements of said hot runner such that said plurality of electric conductor leads pass from an interior of said recess to a zone outside of said base plate.

3. The half-mold of claim 2, wherein said external connector is on an outer surface of said base plate.

4. The half-mold of claim 3, wherein said power supply connector is on an outer surface of said nozzle-carrying plate.

5. The half-mold of claim 4, wherein said nozzle-carrying plate has a through-slot having at least a side thereof opening towards either said cavity-carrying plate or said nozzle-carrying plate, said through-slot being adapted to house said portion of said plurality of electric conductor leads that extends from said resistive elements to said terminal clamp.

6. An injection half-mold, comprising:

a base plate;

a nozzle-carrying plate adapted to be assembled with said base plate;

a cavity-carrying plate adapted to be assembled with said nozzle-carrying plate;

a hot runner provided in said base plate, said hot runner having a plurality of resistive elements that are connected to an external power source by a plurality of electric conductor leads, and said base plate having a recess through which said electric conductor leads extend, such that said electric conductor leads can be removed from said base plate without disconnection of said electric conductor leads from said resistive elements of said hot runner; and a plurality of nozzles supported in said nozzle-carrying plate, said nozzles having a plurality of resistive elements connected to a power supply by a plurality of electric conductor leads, and said electric conductor leads of said nozzles extending outside of said nozzle-carrying plate to a connector through a recess in said nozzle carrying plate, such that said nozzle-carrying plate can be removed from said hot runner without disconnecting said plurality of electric conductor leads of said nozzle-carrying plate from said connector or connections between said plurality of electric conductor leads and said resistive elements of said nozzle-carrying plate.

7. An injection half-mold, comprising:

a base plate;

a nozzle-carrying plate;

a cavity-carrying plate;

a hot runner contained in a housing provided in said base plate, said housing being capable of being closed by said nozzle-carrying plate;

a plurality of resistive elements associated with said hot runner, said plurality of resistive elements being externally connected to a power supply source by a respective plurality of electric conductor leads that are connected to an external connector;

a plurality of nozzles arranged and supported in said nozzle-carrying plate; and a plurality of resistive elements heating respective said nozzles, said plurality of resistive elements being contained in said nozzle-carrying plate and being connected to a power supply source by a respective plurality of electric conductor leads;

wherein at least a portion of said plurality of electric conductor leads of said resistive elements of said nozzle-carrying plate is contained in the body of said nozzle-carrying plate, from which said plurality of electric conductor leads of said resistive elements of said nozzle-carrying plate extend to outside of said nozzle-carrying plate to be connected to a terminal clamp of a power supply connector; and wherein said nozzle-carrying plate is adapted to be removed and displaced away from said hot runner without disconnecting said plurality of electric conductor leads of said resistive elements of said nozzle-carrying plate or connections between said plurality of electric conductor leads and said resistive elements of said nozzle-carrying plate.

* * * * *